T. J. House.
Printers Furniture.
Nº 87,339.    Patented Mar. 2, 1869.
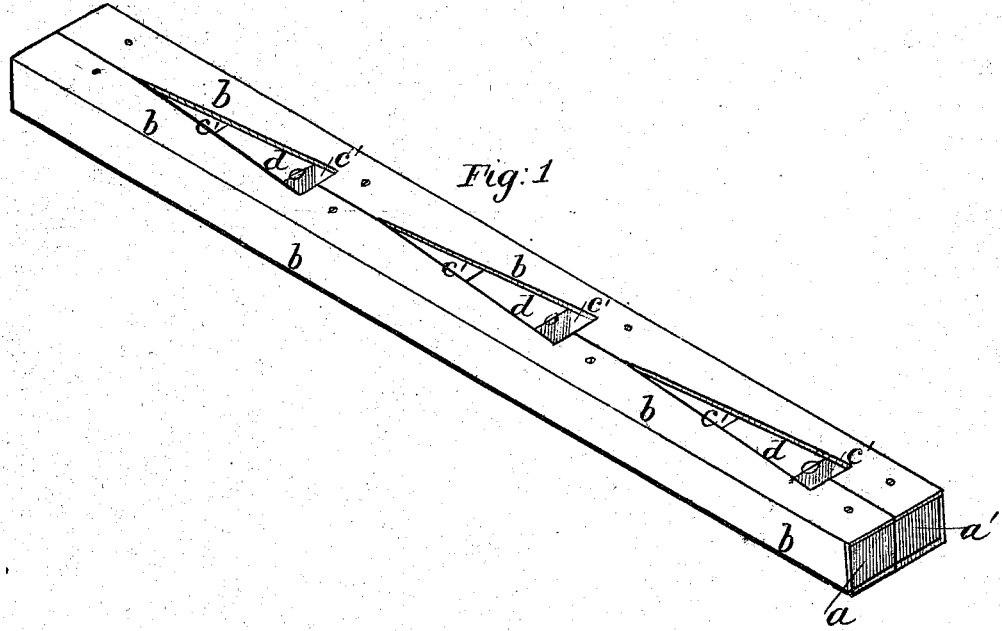
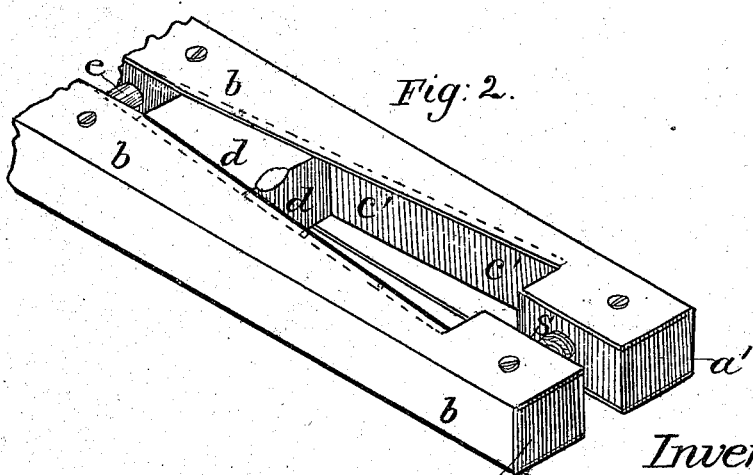
Witnesses
R. C. Wrenshall
Thos. B. Kerr
Inventor;
Thomas J. House.
by Bakewell & Christ
his Atty's.

United States Patent Office.

THOMAS J. HOUSE, OF PITTSBURG, PENNSYLVANIA.

Letters Patent No. 87,339, dated March 2, 1869.

IMPROVEMENT IN PRINTERS' FURNITURE.

The Schedule referred to in these Letters Patent and making part of the same.

*To all whom it may concern:*

Be it known that I, THOMAS J. HOUSE, of Pittsburg, in the county of Allegheny, and State of Pennsylvania, have invented a new and useful Improvement in Side-Stick; and I do hereby declare the following to be a full, clear, and exact description thereof, reference being had to the accompanying drawing, making a part of this specification, in which—

Figure 1 is a perspective view of my improved side-stick, with the quoins in place, but not driven up; and Figure 2 is an enlarged view of one end of my improved side-stick, and showing a quoin in the position it occupies when the form or galley is locked.

My invention consists in the construction of an improved double side-stick, for compositors' and printers' use in locking matter in galleys and forms preparatory to taking proofs or printing.

The side-stick is made of two parallel bars, with grooved inner faces, and one or more inclines in the bottom of each groove, in which inclined-bottomed grooves the quoins are placed, and pressed or driven up, in locking the galley or forms, so as to press one of the parallel bars against the chase, and the other against the form.

Dowel-pins extend from one bar into the other, so that the two shall work directly to or from each other, as the quoins are loosened or tightened.

One or more spiral springs also connect the bars together, so that, when the quoins are loosened, the bars shall approach each other, whereby the quoins will be kept in their places in the grooves while the forms are unlocked.

To enable others skilled in the art to make and use my invention, I will proceed to describe its construction and manner of use.

The side-bars *a a'*, I make of any suitable material; but, in order to secure lightness and cheapness, I make them preferably of hard wood.

A series of inclines, *c c'*, in any desirable number, according to the length of the stick to be made, and the tightness to which the form is to be locked, is made in the inner faces of one or both of the bars *a a'*.

The bars *a a'* are covered, on the upper, lower, and outer faces, each by a metallic plate, *b*, the inner edges of such plates extending inward over the faces of the inclines *c c'*, as shown by the dotted lines, sufficiently far to form, with such inclines, grooves or slides, in which the quoins *d* operate, in locking or unlocking the galley or form.

The dowels *e*, extending from one bar into the other, steady the bars, and prevent them from moving otherwise than to and from each other, while locking and unlocking.

Spiral springs, *s*, or other equivalent device, fastened, in sockets in each, at the opposite ends, draw the bars *a a'* to each other, when the form is unlocked.

The bars *a a'* being then spread apart, a quoin, *d*, of the proper size, is inserted between the faces of each pair of inclines *c c'*, and inside the inner edges of the metallic plate *b*, and the side-stick is ready for use.

The manner of using it is as follows:

The side-stick, as shown in fig. 1, is placed between the side of the galley and the matter therein, and the quoins *d* are pressed up the inclines *c c'*, by hand ordinarily, with sufficient tightness.

If used in locking forms for the press, it is placed between the side or end of the chase and the matter, and the quoins are driven up, with mallet and shooting-stick, till the forms are locked to the degree of tightness required.

When unlocked, the quoins are kept in place by the projecting edges of the plate *b*, so as not to be lost or mislaid when wanted.

The projecting edges of the plate *b*, in connection with the inclines *c c'*, practically form inclined-faced grooves, in which the quoins operate.

If so preferred, the inclines may be made in but one of the bars, the other presenting a straight-grooved face; and I include in my invention bars made of other material and other ways, provided such bars, or either of them, have inclined-bottomed grooves, in which to use the quoins.

They may be made of wood or metal entirely, and the grooves, with inclined bottoms, be made in the inner face of either or each bar, so as to leave flanges above and below, to form the sides of the grooves, and to keep the quoins in place.

The advantages of a side-stick so constructed are its cheapness, simplicity, and ready adaptability to every kind of work or size of form, requiring no change in the galleys or chases now in use.

The side-stick and quoins, being united together, can be used or removed more readily than the side-sticks and quoins heretofore in use.

What I claim as my invention, and desire to secure by Letters Patent, is—

A side-stick, consisting of two parallel bars, connected by spiral springs, or other equivalent device, with inclined-bottomed grooves or slides in the inner face of one or both the parallel bars, in which grooves or slides operate the quoins, substantially as and for the purposes above set forth.

In testimony whereof, I, the said THOMAS J. HOUSE, have hereunto set my hand.

THOMAS J. HOUSE.

Witnesses:
 THOS. B. KERR,
 JOHN GLENN.